United States Patent [19]

Baker

[11] Patent Number: 4,720,174
[45] Date of Patent: Jan. 19, 1988

[54] LIQUID CRYSTAL OPTICAL SWITCHING DEVICE WITH INTEGRALLY ATTACHED OPTICAL FIBERS

[75] Inventor: Anthony P. Baker, New York, N.Y.

[73] Assignee: ITT Defense Communications, A Division of ITT Corporation, Nutley, N.J.

[21] Appl. No.: 795,152

[22] Filed: Nov. 5, 1985

[51] Int. Cl.$^4$ .................... G02F 1/13; G02B 6/42
[52] U.S. Cl. .................... 350/347 V; 350/96.13; 350/96.15
[58] Field of Search ............ 350/347 V, 339 F, 96.13, 350/96.15

[56] References Cited

U.S. PATENT DOCUMENTS

| 4,278,327 | 7/1981 | McMahon et al. | 350/96.13 |
| 4,461,536 | 7/1984 | Shaw et al. | 350/96.15 |
| 4,556,288 | 12/1985 | Sekimura | 350/339 F |

OTHER PUBLICATIONS

Steinberg et al., "Polarization-Insensitive Integrated-Optical Switches: A New Electrode Design," Applied Optic, vol. 16, No. 8, (1977), pp. 2166-2170.

Primary Examiner—John K. Corbin
Assistant Examiner—Martin Lerner
Attorney, Agent, or Firm—Robert A. Walsh; Thomas N. Twomey; Mary C. Werner

[57] ABSTRACT

A liquid crystal optical switching device that is independent of critical angle accuracies in the manufacturer and operation thereof includes an exposed fiber optic proximate the liquid crystal material.

13 Claims, 1 Drawing Figure

LIQUID CRYSTAL OPTICAL SWITCHING DEVICE WITH INTEGRALLY ATTACHED OPTICAL FIBERS

CROSS-REFERENCE TO RELATED APPLICATIONS

This application is related to one, or more, of the following U.S. patent applications: Ser. No. 795,156; Ser. No. 795,151; Ser. No. 595,150; Ser. No. 795,155; Ser. No. 795,138; Ser. No. 795,148; Ser. No. 795,157; Ser. No. 795,154; Ser. No. 795,149; Ser. No. 795,296 all filed on even date herewith. All of the above applications are assigned to the assignee hereof.

BACKGROUND OF THE INVENTION

The present invention generally relates to a liquid crystal optical switching device and, in particular, relates to such an optical switch including optical fibers that are integrally positioned at a surface proximate the liquid crystal material.

Optical switches are a subject of considerable research and development in light of the recognized advantages of using an optical fiber as a transmission medium in a telecommunications system. To date, most optical switches utilizing liquid crystal material have required precise alignment of an incoming light beam with the liquid crystal surface as well as, a means for collimating the light beam as it leaves an optical fiber.

In many liquid crystal based devices previously proposed, expensive lenses and numerous optically flat surfaces were required to ensure that an inputted light signal would be incident upon the switching surface of the liquid crystal material at the appropriate critical angle. Such devices have been described in U.S. Pat. No. 4,201,442 issued to McMahon et al. on May 6, 1980, U.S. Pat. No. 4,278,327 issued to McMahon et al. on July 14, 1981 and U.S. Pat. No. 4,385,799 issued to Soref on May 31, 1983. These particular devices are characteristically expensive to manufacture since they require numerous optically flat surfaces to be correctly aligned with each other but also require expensive collimating lens to direct the inputted light beam onto a specific point on the liquid crystal surface. Such devices are not particularly amenable to mass production techniques.

A majority of the problems associated with such optical switching devices have been substantially completely obviated by more recently developed devices such as those discussed and described in U.S. patent application Ser. No. 795,156 and 795,151 entitled LIQUID CRYSTAL OPTICAL SWITCHING DEVICE and LIQUID CRYSTAL OPTICAL SWITCHING DEvICE HAvING MINIMIZED INTERNAL LIGHT PATH respectively, both filed on even date herewith and assigned to the assignee hereof. These patent applications are deemed incorporated herein by reference. Nevertheless, the devices described, although amenable to mass production techniques and requiring fewer optically flat surfaces, still require that the incident light impinge on the liquid crystal material at the appropriate critical angle. The requirement of aligning an optical fiber during the manufacture of the recently developed liquid crystal optical switches is usually accomplished manually and thus incurs time and expense that, if eliminated, would result in a considerable direct cost reduction if eliminated.

Further, whenever light is directed through any medium there is a concern that the light signal will be dispersed or deflected by impurities within that medium. Thus, regardless of the other factors the purity of the transparent medium is always a concern in the fabrication of liquid crystal optical switching devices.

Consequently, the elimination of the critical angle alignment requirement is highly desirous to providing an inexpensive, efficient, liquid crystal optical switching device.

SUMMARY OF THE INVENTION

Accordingly, it is one object of the present invention to provide a liquid crystal optical switching device that eliminates the need for critical angle alignment.

This object is achieved, at least in part, by a liquid crystal optical switching device having optical fibers integrally attached thereto proximate the liquid crystal material.

Other objects and advantages will become apparent to those skilled in the art from the following detailed description read in conjunction with the appended claims and the drawing attached hereto.

BRIEF DESCRIPTION OF THE DRAWINGS

The single Figure of the drawing, not drawn to scale, is a cross sectional view of a liquid crystal optical switching device embodying the principles of the present invention.

DETAILED DESCRIPTION OF THE INVENTION

Figure 1:
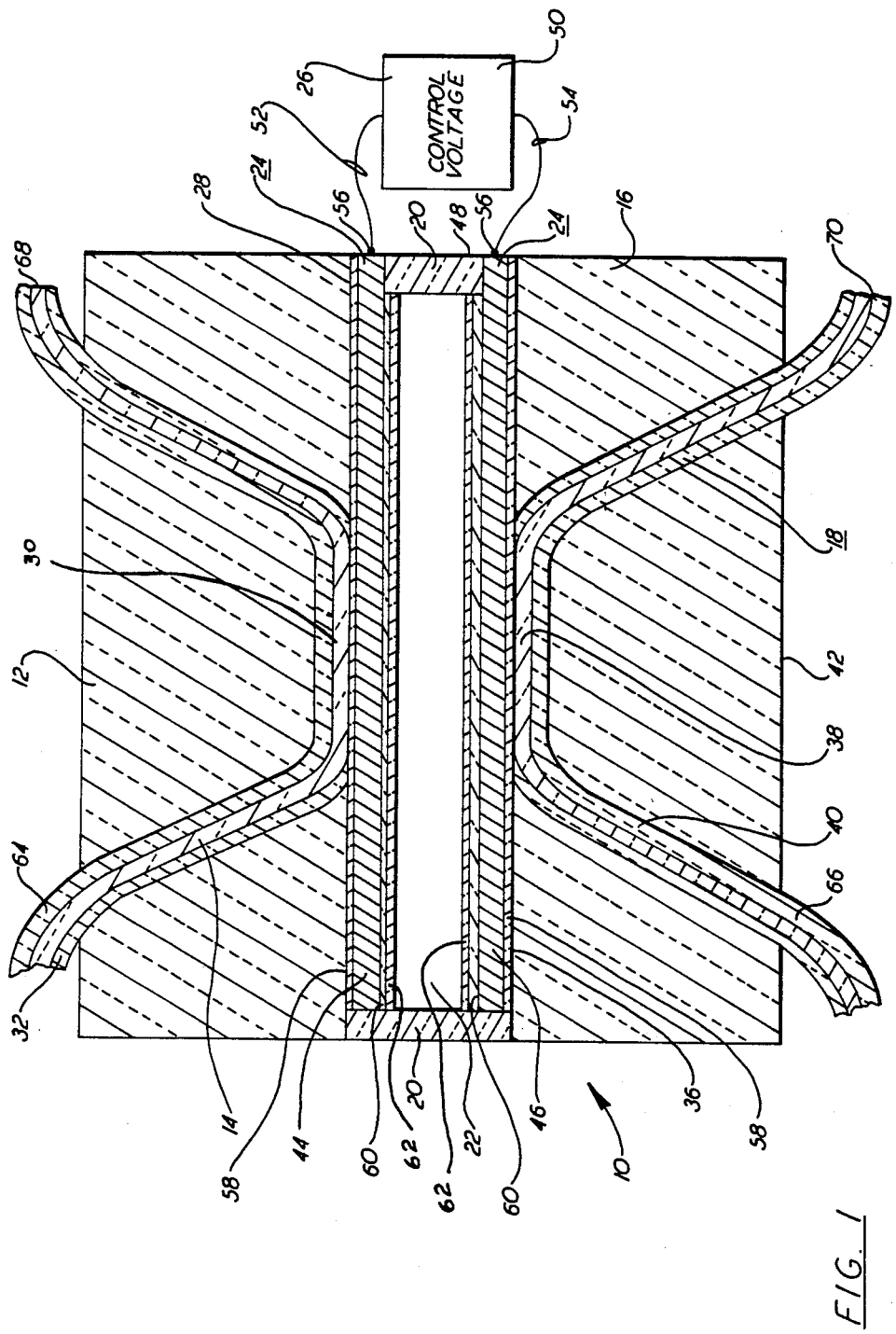

A liquid crystal optical switching device, generally indicated at 10 in the Figure and embodying the principles of the present invention, includes a first member 12 having a first optical fiber 14 affixed therein, a second member 16 having a second optical fiber 18 affixed therein, means 20 for retaining a liquid crystal material 22 between the first and second members, 12 and 16, respectively, means 24 for sustaining an electromagnetic field in tne liquid crystal material 22, and means 26 for switching at least a portion of a light beam between the first optical fiber 14 and the second optical fiber 18.

The first member 12 includes a first major surface 28 having a length of the exposed core 30, i.e., sans cladding 32, of the first optical fiber 14 coplanar therewith. Preferably, the first optical fiber 14 exits the first member 12 at a second major surface 34 of the first member 12. However, if convenient, the first optical fiber 14 could be adapted to exit the first member 12 by any other surface thereof.

Similarly, the second member 16 includes a first major surface 36 having a length of the exposed core 38, i.e., sans cladding 40, of the second optical fiber 18 coplanar therewith. Preferably, the second optical fiber 18 exits the second member 16 at a second major surface 42 thereof. Naturally, if convenient, the second optical fiber 18 can exit the second member 16 at any other surface thereof.

Preferably, as more fully discussed below, the axes of the exposed cores, 30 and 38, are parallel with the first major surfaces, 28 and 36, respectively, of the first and second members, 12 and 16, respectively, for a length at least equal to the critical coupling distance.

The liquid crystal material retaining means 20 can be any type of spacer formed of a material that is inert to the liquid crystal material 22, for example, ordinary glass. In one implementation, the spacers are retained in position, and thus act to retain the members, 12 and 16, in their relative positions with respect to each other, by an epoxy. Preferably, the epoxy is also inert to the liquid crystal material 22 and of a type that can be cured via ultraviolet heating.

In one embodiment, the first and second major surfaces, 28 and 34, of the members, 12 and 16, respectively, include the means 24 for sustaining an electromagnetic field deposited thereon in the form of first and second electrodes, 44 and 46, respectively. Preferably, each electrode, 44 and 46, is, for example, a three hundred Angstrom thick layer of Indium Tin Oxide (ITO) and may be formed on the first surfaces, 28 and 34, by conventional deposition or sputtering techniques. In general, the thickness of the electrodes, 44 and 46, should not be more than a quarter of the wavelength of the light being switched. In the embodiment shown, the first and second members, 12 and 16, are spaced apart by about five hundred micrometers of a nematic liquid crystal material 22 such as, for example, stock number EM1132 manufactured and marketed by Merck & Co. of Rahway, New Jersey.

In the embodiment depicted in the Figure, the first and second electrodes, 44 and 46, respectively, extend to one edge 48 of the device 10 whereat they can be connected to a source of control voltage 50 by a pair of electrically conductive leads, 52 and 54, that can be attached to the electrodes, 44 and 46, by means of an electrically conductive epoxy 56.

In one preferred embodiment, the electrodes, 44 and 46, are spaced apart from the first major surfaces, 28 and 36, respectively, by a means 58 for matching the index of refraction therebetween. The means 58 can be a single layer having an index of refraction gradiant thereacross that matches, on one side, the index of refraction of the member, 12 or 16, and, on the other side, matching the index of refraction of the electrode, 44 or 46, respectively. In addition, the electrodes, 44 and 46, are preferably spaced apart from the liquid crystal material 22, per se, by a means 60 for matching the index of refraction of liquid crystal material 22 with the material of the electrodes, 44 and 46. The means 60 can be a single layer of material having an index of refraction gradiant thereacross that, on one side, matches the index of refraction of the electrode, 44 and 46, and, on the other side, matches the index of refraction of the liquid crystal material 22. Further, it is preferred that the surface adjacent the liquid crystal material 22, whether an index of refraction matching means 60 or an electrode, 44 or 46, include a surfactant layer 62. For example, a 300 Angstrom thick layer of $S_iO$, or the like, generally effects the orienting of the liquid crystal molecules in the absence of an electromagnetic field. Other surfactants could be a polyvinyl alcohol or a polyimide. Alternatively, the liquid crystal material 22 could be doped to effect the molecular alignment. The index of refraction matching, in one embodiment, is accomplished by techniques discussed and described in U. S. patent application Ser. No. 795,150 entitled LIQUID CRYSTAL CELL FOR USE IN AN OPTICAL SWITCH, filed on even date herewith and assigned to the assignee hereof. This application is deemed incorporated herein by reference.

The device 10 described above is particularly amenable to mass production techniques since the first and second members, 12 and 16, thereof can be made by identical manufacturing techniques and are preferably identical to each other. In one particular fabrication technique, each optical fiber, 14 and 18, is rigidly positioned in a mold. Thereafter the material composing the members, 12 and 16, for example, a conventional plastic, is poured into the mold and allowed to cure. After curing, the first and second major surfaces, 28 and 36 and 34 and 42, are formed using known polishing and lapping techniques to remove the excess material and expose the optical fiber core, 30 and 38, i.e. by removing a portion of the cladding, 32 and 40, respectively. Thereafter, the index of refraction matching means 58 and the electrodes, 44 and 46, are deposited on each first major surface, 28 and 36, using techniques well known in the liquid crystal fabrication art. The index of refraction matching means 60 and the surfactant 62 are similarly formed.

In one preferred embodiment, the first and second members, 12 and 16, respectively, are formed from a clear plastic. The optical fibers, 14 and 18, have a core outside diameter of about 10 micrometers and a cladding outside diameter of about 125 micrometers. The critical coupling distance "L" is determined from the formula:

$$L = \pi/2X \text{ wherein}$$

X is the coupling constant that measures the overlapping between the fields in the two optical fibers, 14 and 18.

Thus, in one operational embodiment wherein the primary operating wavelength is 1300 nanometers, the cores should be exposed for about 1 millimeter adjacent the first major surfaces, 28 and 36, respectively. This requires, during fabrication, that the axes of the optical fibers, 14 and 18, placed in the mold be parallel to the bottom thereof for at least an odd integer multiple of this distance. Hence, when the first major surfaces, 28 and 36, are finished the cores will be exposed for the requisite critical distance.

In operation, the device 10 couples the evanescent waves traveling through the optical fibers, 14 and 18. The degree of coupling being directly related to the coupling coefficient as controlled by the molecules of the liquid crystal material 22. Thus, for example, a nematic liquid crystal material, in an unpowered condition will reflect substantially all of the evanescent light along the exposed cores, 30 and 38. However, when a voltage of about 6 volts is applied across the electrodes, 44 and 46, the evanescent waves traverse the liquid crystal material 22. Depending upon the magnitude of the voltage, the optical fibers, 14 and 18, can function to either switch a light signal across the liquid crystal material 22 or couple only a portion of such a light signal thereacross.

In operation, although the device 10 is fully bidirectional, first and second members, 12 and 16, respectively, can be considered to include an input port, 64 and 66, respectively, and an output port, 68 and 70, respectively. Hence, light entering the input port 64 of the first member 12 can be totally reflected to the output port 68 thereof or, when the control voltage is in the switched position, have a substantial portion of the light switched to the output port 70 of the second member 16. Similarly, light entering from the input port 66 can be divided between the output ports 68 and 70.

Further, when an input signal is provided at both the second input ports, 64 and 66, the device 10 effectively operates as a light coupler whereby a portion of each of the input signals is transferred to each of the output ports 68 and 70.

Advantageously, the proportioning of the light divided between the output ports, 68 and 70, from either of the input ports, 64 or 66, is primarily dependent on the polarity and magnitude of the voltage applied to the first and second electrodes, 44 and 46, respectively. Hence, the amount of coupling between the output ports, 68 and 70, is variable and the device 10 can operate as an optical shutter or light coupler. Also advantageously, the light controlled by the device 10 does not traverse any media but the liquid crystal material 22 and the associated index of refraction matching means, 58 and 60. Consequently, the possibility of signal loss due to internal impurities is substantially eliminated. The operation as described is directed to an incident light beam from a single mode optical signal. Naturally, the device 10 can function for multimode light, although, the critical coupling distance and the proportions divided between the two output ports, 68 and 70, are adjusted accordingly.

The above described device has considerable advantages over existing optical switches in that the optical fibers, 14 and 18, are essentially, directly connected to the liquid crystal material 22 and, hence, the need for a critical angle alignment of the incident light beam or a collimating lens is substantially completely eliminated.

Although the present invention has been described herein by means of an exemplary embodiment, it will be understood that other arrangements and configurations may also be developed that nevertheless do not depart from the spirit and scope of the present invention. Hence, the present invention is deemed limited only by the appended claims and the reasonable interpretation thereof.

What is claimed is:

1. A liquid crystal device comprises:
   a first optical fiber having a portion of the core thereof exposed;
   a second optical fiber having a portion of the core thereof exposed, said exposed core of said first optical fiber being proximate said portion of said exposed core of said second optical fiber; and
   means for varying the coupling coefficient between said exposed cores, said means including a liquid crystal material between said exposed cores.
2. Device as claimed in Claim 1 further comprises:
   a first member having a first surface, said first member having said first optical fiber affixed therein such that said portion of exposed core thereof is substantially coplanar with said first surface of said first member; and
   a second member having a first surface, said second member having said second optical fiber affixed therein such that said portion of exposed core thereof is substantially coplanar with said first surface of said second member.
3. Device as claimed in Claim 2 wherein said first and second members are plastic.
4. Device as claimed in Claim 2 further comprising:
   means for retaining said liquid crystal material between said first surfaces of said first and second members.
5. Device as claimed in Claim 4 wherein said liquid crystal material retaining means includes a plurality of glass spacers.
6. Device as claimed in Claim 2 further comprising:
   means for sustaining an electromagnetic field in said liquid crystal material.
7. Device as claimed in Claim 6 wherein said electromagnetic field sustaining means includes a first electrode and a second electrode.
8. Device as claimed in Claim 7 wherein said first electrode overlies said first surface of said first member and said second electrode overlies said first surface of said second member.
9. Device as claimed in Claim 8 further comprising:
   means for matching the indices of refraction of said first surfaces and said electrodes.
10. Device as claimed in Claim 9 further comprising:
    means for matching the indices of refraction between said electrodes and said liquid crystal material.
11. Device as claimed in Claim 10 further comprising:
    a surfactant, said surfactant overlying said second index refraction means and adjacent said liquid crystal material.
12. Device as claimed in Claim 1 wherein each said portion of exposed core is at least equal to an odd integer multiple of the critical coupling length.
13. Device as claimed in Claim 12 wherein said portions of exposed core are axially parallel with said first surfaces.

* * * * *